United States Patent [19]

Bäbler et al.

[11] Patent Number: 5,223,624
[45] Date of Patent: Jun. 29, 1993

[54] MODIFIED GAMMA-QUINACRIDONE PIGMENT

[76] Inventors: Fridolin Bäbler, 509 Stenning Dr., Hockessin, Del. 19707; Edward E. Jaffe, 3 Crenshaw Dr., Wilmington, Del. 19810

[21] Appl. No.: 748,473

[22] Filed: Aug. 22, 1991

[51] Int. Cl.⁵ .................................... C09B 48/00
[52] U.S. Cl. ............................ 546/49; 106/497
[58] Field of Search ............................ 546/49

[56] References Cited

U.S. PATENT DOCUMENTS

| | | | |
|---|---|---|---|
| 2,844,484 | 7/1958 | Reidinger et al. | 546/49 |
| 2,844,485 | 7/1958 | Struve | 546/49 |
| 2,844,581 | 7/1958 | Manger et al. | 546/49 |
| 2,969,366 | 1/1961 | Griswold et al. | 546/49 |
| 3,074,950 | 1/1963 | Deuschel et al. | 546/49 |
| 3,272,821 | 9/1966 | Schweizer | 546/49 |
| 4,247,696 | 1/1981 | Shibata et al. | 546/49 |
| 4,760,144 | 7/1988 | Jaffe | 546/49 |
| 4,857,646 | 8/1989 | Jaffe | 546/49 |
| 5,093,497 | 3/1992 | Schütze | 546/49 |

FOREIGN PATENT DOCUMENTS

| | | | |
|---|---|---|---|
| 1290522 | 3/1969 | Fed. Rep. of Germany | 546/49 |
| 47-9101 | 3/1972 | Japan | 546/49 |
| 0130621 | 10/1979 | Japan | 546/49 |
| 0135821 | 10/1979 | Japan | 546/49 |
| 0035055 | 2/1985 | Japan | 546/49 |

OTHER PUBLICATIONS

Abstract Chem. Abstr. vol. 92 entry 112354z (1979) Japan 54-135821.
Abstract Chem. Abstr. vol. 113 entry 154271c (1990) German 3,834,748.

Primary Examiner—Donald G. Daus

[57] ABSTRACT

A new gamma quinacridone polytype having a yellowish-red color and a distinct X-ray diffraction pattern, said new form being prepared directly in high yield in pigmentary form by oxidation of 6,13-dihydroquinacridone in a basic dimethylsulfoxide medium.

3 Claims, 3 Drawing Sheets

MODIFIED GAMMA-QUINACRIDONE PIGMENT

Quinacridone, also referred to as 5,12-dihydroquino[2,3-b]acridine-7,14-dione of the following formula

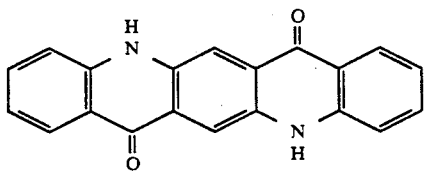

is known to exist in three major polymorphic modifications. The alpha (U.S. Pat. No. 2,844,484) and gamma (U.S. Pat. Nos. 2,844,581 and 2,969,366) polymorphs are bluish-red pigments, the beta polymorph is described in U.S. Pat. No. 2,844,485 as a violet form and in U.S. Pat. No. 4,857,646 as a magenta form while the delta polymorph obtained by sublimation of quinacridone is described as a yellowish red quinacridone in U.S. Pat. No. 3,272,821. Since alpha, gamma and delta polymorphs are red pigments and gamma is the most stable, only gamma is of commercial interest.

The gamma polymorph also is known to exist in two forms, an older form (U.S. Pat. No. 2,844,581) which is bluish red, and a more recently recognized form (U.S. Pat. No. 3,074,950) which is yellowish red. The two forms are distinguished by their color and their X-ray diffraction patterns. The bluish-red form, designated "γ-II", shows three strong lines at 6.6, 13.9 and 26.3; five medium lines at 13.2, 13.4, 23.6, 25.2 and 28.3; and two weak lines at 17.1° and 20.4° 2θ double glancing angles. The yellower form designated "γ-I", shows three strong lines at 6.6, 13.9 and 26.5; three lines of medium intensity at 13.2, 13.5 and 23.8 and four weak lines at 17.1°, 20.5°, 25.2° and 28.6° 2θ double glancing angles.

Japanese Patent 54-135821 discloses the preparation of quinacridone pigments by oxidizing 6,13-dihydroquinacridone in the presence of water, alkali and an oxidizing agent like sodium-o-nitrophenoxide, sodium m-nitrobenzene sulfonate, sulfur powder, selenium, iodine or air, to obtain a quinacridone salt solution, which when diluted with polar solvents or aqueous acid precipitates quinacridone. Although this process produces quinacridones and both beta and gamma quinacridones are described, the gamma form is produced by acidification without the polytype being identified and the examples demonstrate that only the β-phase quinacridone is obtained when the resulting quinacridone salt solution is drowned into methanol.

U.S. Pat. No. 4,247,696 discloses a finely divided gamma quinacridone pigment prepared by a process wherein a crude quinacridone is dissolved in dimethylsulfoxide in the presence of a caustic alkali and water and the pigment precipitated by an aqueous mineral acid or a mixture of a mineral acid with at least one diluent selected from water, dimethylsulfoxide and a monohydric alcohol with 1 to 3 carbon atoms. The resulting finely divided gamma quinacridone is specified by an X-ray diffraction pattern exhibiting strong peaks at 6.4, 13.7 and 26.3, and weak peaks at 16.8°, 20.2° and 23.6° 2θ double glancing angles. Although this process has the advantage of producing pigmentary form quinacridone without further conditioning, it correspondingly has the disadvantages of utilizing quinacridone crude as the starting material and requiring effective inerting conditions to avoid undesirable oxidation to quinacridonequinone. Thus, any available oxygen would serve to oxidize the crude quinacridone to quinacridonequinone, while the solubilizing heating required in the process further encourages the undesirable oxidation reaction.

German 3,834,748 discloses a process for preparing quinacridone and substituted quinacridones in conventional gamma form by oxidation of dihydroquinacridone in the presence of base, solvent, catalyst and a required quaternary ammoniumsalt.

U.S. Pat. No. 4,760,144 describes a process for preparing a yellow shade modification of gamma quinacridone whereby the γII form is converted to the γI form by milling in an alcohol and in the presence of a base or by premilling the γII form to the γI form and then refluxing or milling the resulting γI form in an alcohol in the presence of a base. These processes demonstrate the current use of expensive conditioning steps in order to obtain the yellowish γI form of quinacridone.

The present invention relates to a new distinct hitherto unknown exceptionally yellowish red γ-form of quinacridone which is designated as "γIII" form. It also relates to a new process for preparing the γIII form by the direct oxidation of 6,13-dihydroquinacridone to quinacridone in the presence of a basic dimethylsulfoxide medium and an oxidizing agent and the use of catalytic amounts of an anthraquinone derivative followed by precipitation of the pigment by methanol. The discovery is particularly valuable since the new yellow shade γIII form can thus be obtained directly in high yield in pigmentary form from 6,13-dihydroquinacridone. Additionally, undesirable oxidation to quinacridonequinone is virtually eliminated without the need for inert conditions inasmuch as the oxygen is primarily available for the oxidation reaction to quinacridone rather than for the above. The presence of the starting material in solution at the onset of oxidation without the need for subsequent heating further eliminates the possibility of the undesirable oxidation to quinacridonequinone.

The new gamma form shows a distinctive X-ray diffraction pattern. In comparison to the known γI and γII forms, the new γIII form shows a significant change in the region of 13° to 14.5° 2 theta double glancing angle as well as a shift of some bands to longer double glancing angles.

The complete X-ray diffraction pattern measured on a RIGAKU CEIGERFLEX Diffractometer Type D/Max II v BX, of the new γIII form, including weak bands in terms of interplanar spacing and corresponding double glancing angles, is as follows:

| interplanar spacings (d-value in angstroms) | intensity | double glancing angles (degree 2 theta) |
|---|---|---|
| 13.2 | strong | 6.7 |
| 6.7 | strong | 13.3 |
| 6.5 | medium | 13.6 |
| 6.3 | strong | 14.0 |
| 5.2 | weak | 17.2 |
| 4.3 | weak | 20.6 |
| 4.0 | weak | 21.9 |
| 3.7 | weak | 24.0 |
| 3.5 | weak | 25.3 |
| 3.3 | strong | 26.6 |
| 3.2 | weak | 28.1 |

| interplanar spacings (d-value in angstroms) | intensity | double glancing angles (degree 2 theta) |
|---|---|---|
| 3.1 | weak | 28.8 |

The accompanying drawings show the respective X-ray patterns, wherein

Figure 1:
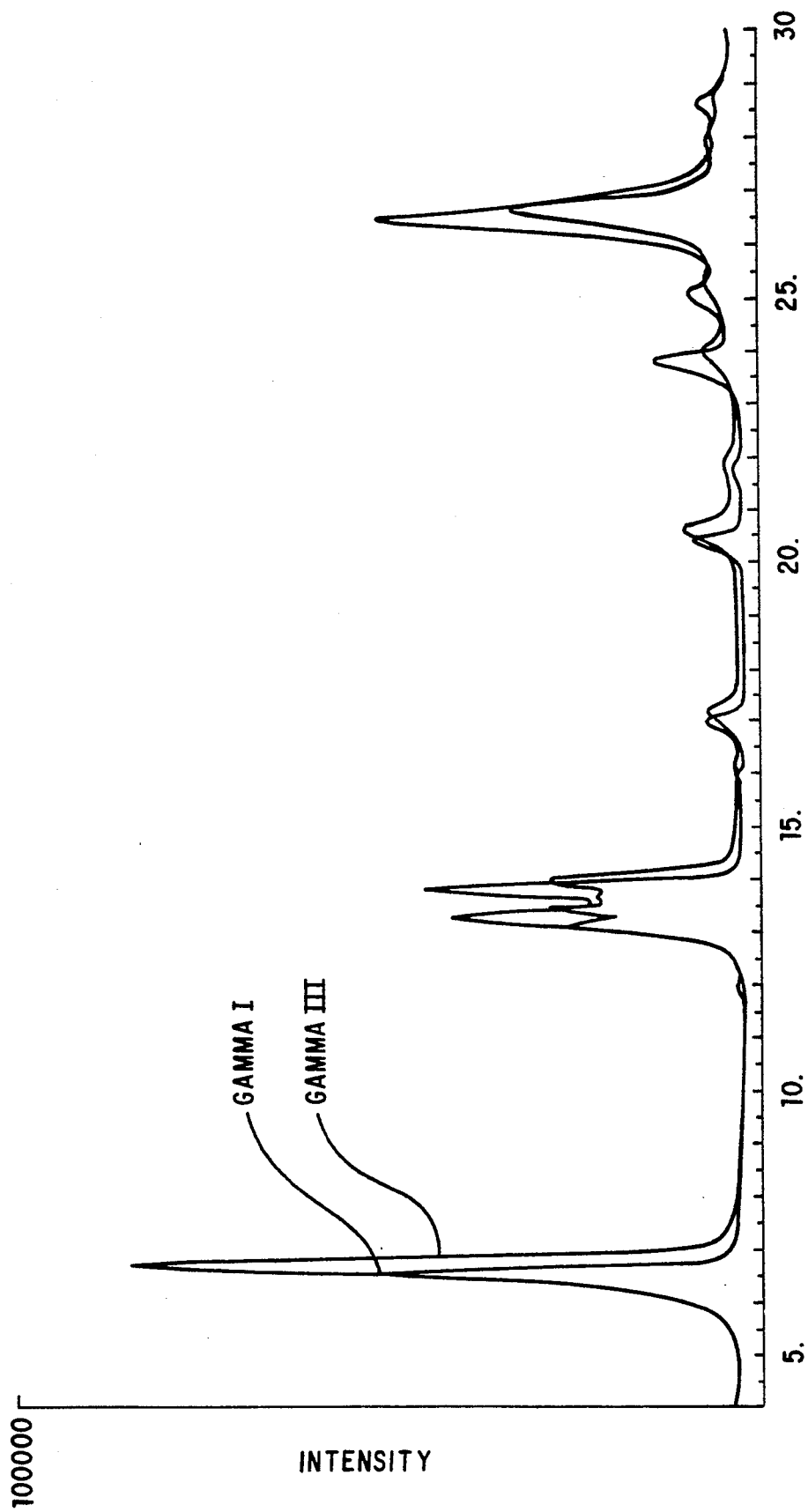
FIG. 1 is the X-ray pattern of the new γ-III form compared to the X-ray pattern of the known γ-I form.
Figure 2:
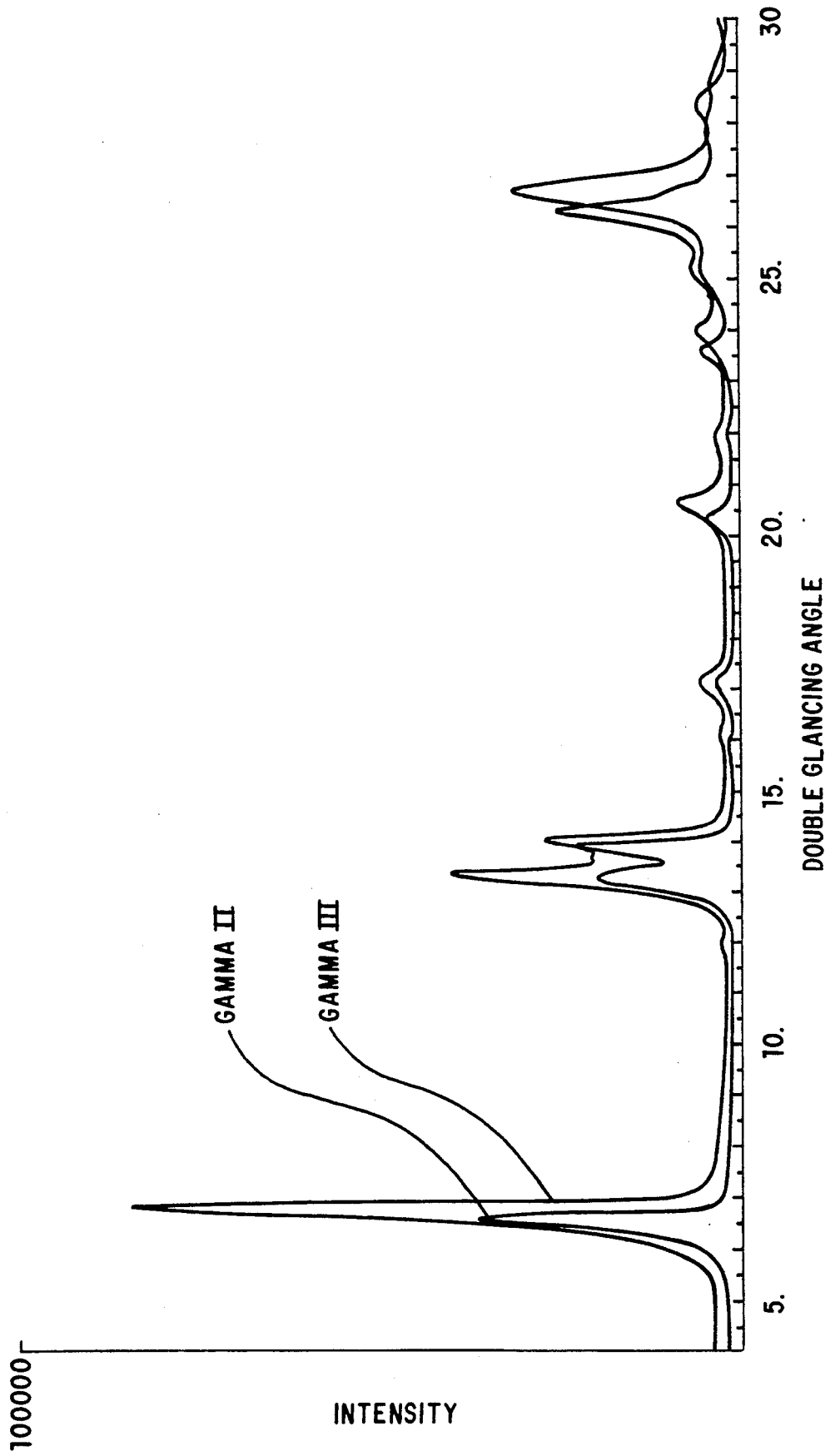
FIG. 2 is the X-ray pattern of the new γ-III form compared to the X-ray pattern of the known γ-II form.
Figure 3:
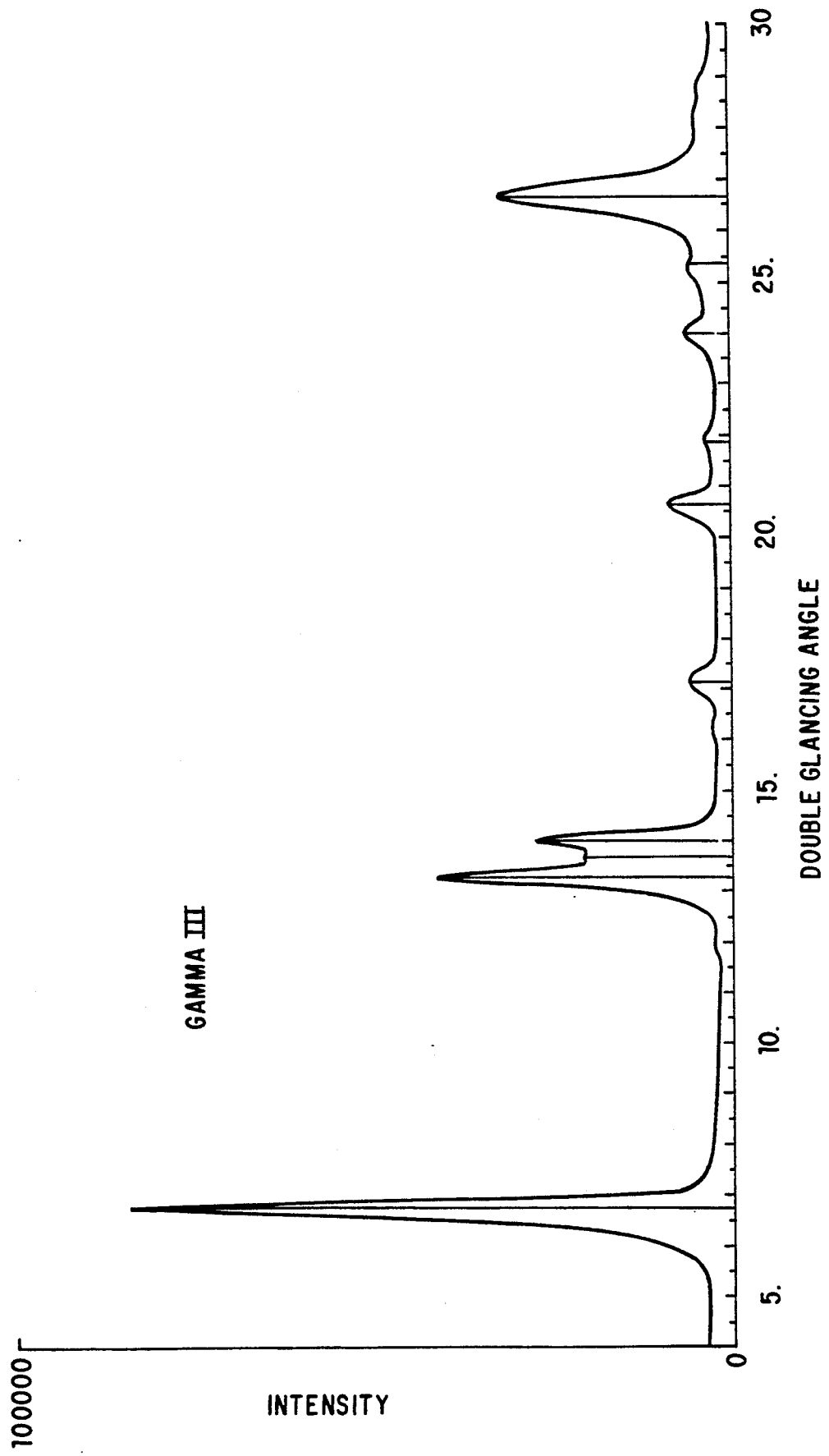
FIG. 3 is the X-ray pattern of the new γ-III form.

In each instance, the x-axis reflects double glancing angles while the y-axis reflects the intensity of the diffracted ray. The characteristic differences supporting the existence of a new gamma form are thus evident.

The process for preparing the modified gamma polytype involves direct oxidation of 6,13-dihydroquinacridone in a basic dimethylsulfoxide medium in the presence of catalytic amounts of an anthraquinone derivative. The 6,13-dihydroquinacridone reactant is known as are procedures for its preparation.

Bases which prove particularly suitable for this process are, for example, alkali metal hydroxides such as potassium hydroxide and preferably sodium hydroxide. A suitable molar ratio of 6,13-dihydroquinacridone to the base is 1:1.9 to 1:7, and preferably a ratio of 1:2.1 to 1:5.5. After the oxidation is completed, the generated salt of the quinacridone is dissolved in the dimethylsulfoxide phase and excess base, if any, is dissolved in a heavier aqueous phase which can be separated for re-use.

The presence of water during the oxidation step is essential in order to increase the solubility of the base in the dimethylsulfoxide. The presence of water during the precipitation and formation of the new gamma form can be tolerated in amounts that do not impair the formation of the new γ-III quinacridone. It is thus used in an amount of 0.2 to 3.0 parts and preferably 0.3 to 2.0 parts, per part of 6,13-dihydroquinacridone.

Oxidizing agents include oxygen-containing gas mixtures, for example, oxygen/nitrogen or oxygen/argon mixtures with at least 2% oxygen. Air is preferably used. The oxygen-containing gas mixture is introduced below or above the surface of the reaction mixture. The oxidation reaction is conducted at temperatures below 100° C., preferably 60°-100° C. and most preferably 70°-90° C. Additionally, the oxidation reaction can be conducted under pressure.

The presence of catalytic amounts of an anthraquinone derivative during the oxidation step leads in a short reaction time to high yields of quinacridone. The presence of the catalyst and the use of the indicated oxidation temperatures result in a quinacridone product substantially devoid of undesirable quinacridonequinone (QAQ). In the absence of the catalyst, formation of QAQ is difficult to avoid.

Particularly suitable anthraquinone catalysts are, for example, anthraquinone, its mono and/or dichloro- and most preferably 2-sulfonic acid and/or 2,6-disulfonic acid-derivatives. The anthraquinone catalyst is present in an amount ranging from 0.005 to 0.15 times the weight of 6,13-dihydroquinacridone, and most preferably 0.01 to 0.09 times.

Several precipitation methods are available for generation of the quinacridone from the resulting quinacridone salt solution. In a preferred procedure, the hot reaction mixture is drowned into 1.5 to 7 parts and preferably 1.6 to 5 parts of cold methanol, per part of dimethylsulfoxide, said methanol preferably being maintained below about 40°.

The particle size of the pigment can be controlled by varying the time and temperature after pigment precipitation in the basic solvent mixture. The presence of particle growth inhibitors, also known as antiflocculating agents which are described, for example, in U.S. Pat. No. 3,386,843, U.S. Pat. No. 4,310,359, U.S. Pat. No. 4,692,189, EP 321-397-A, EP 321-919-A and EP 362-690-A, during the precipitation and ripening process can be effective when the formation of the new γ-III form is not hindered.

When the ripening and thus the formation of the new gamma form according to the invention is complete, the pigment in its desired pigmentary form is isolated by filtration with the presscake being washed with water or an organic solvent, preferably methanol, followed by water and dried.

Depending on the end use, it can be advantageous to add specific amounts of texture improving agents to the pigment in addition to particle growth inhibitors. Suitable texture improving agents are, for example, fatty acids of not less than 18 carbon atoms, such as stearic or behenic acid or the amides or metal salts thereof, preferably calcium or magnesium salts, as well as plasticizers, waxes, resin acids such as abietic acid or metal salts thereof, colophonium, alkyl phenols or aliphatic alcohols such as stearyl alcohol or vicinal diols such as dodecane-1,2-diol, and also modified colophonium/maleate resins or fumaric acid/colophonium resins or polymeric dispersants. The texture improving agents are preferably added in amounts of 0.1 to 30% by weight, most preferably of 2 to 15% by weight, based on the final product.

The compositions of this invention are suitable for use as pigments for coloring high molecular weight organic materials. Examples of high molecular weight organic materials which may be colored or pigmented with the compositions of this invention are cellulose acetate, cellulose butyrate, natural resins or synthetic resins such as polymerization resins or condensation resins, for example aminoplasts, in particular urea/formaldehyde and melamine/formaldehyde resins, alkyd resins, acrylic resins, phenolic plastics, polycarbonates, polyolefins, polystyrene, polyvinyl chloride, polyamides, polyethers, polyetherketones, polyurethanes, polyesters, rubber, casein, silicone and silicone resins, singly or in mixtures.

The above high molecular weight compounds may be used singly or as mixtures in the form of plastics, melts or of spinning solutions, varnishes, paints or printing inks. Depending on the end use, it is advantageous to use the pigments as toners or in the form of preparations. The compositions of the invention are preferably employed in an amount of 0.1 to 30% by weight based on the high molecular organic material to be pigmented.

Pigmentation of high molecular weight organic compounds with the pigment of the invention is carried out, for example, by incorporating such pigment, optionally in the form of a masterbatch, into the substrates using roll mills, mixing or grinding machines. The pigmented material is then brought into the desired final form by methods which are known per se, for example calendaring, molding, extruding, coating, spinning, casting or by injection molding. It is often desirable to incorporate plasticizers into the high molecular compounds before processing in order to produce non-brittle moldings or to diminish their brittleness. Suitable plasticizers are, for example, esters of phosphoric acid, phthalic acid or sebacic acid. The plasticizers may be incorporated before or after working the composition into the polymers. To obtain different shades, it is also possible to add filters or other chromophoric components such as white, colored or black pigments, in any amount, to the high molecular organic compounds.

For pigmenting varnishes and printing inks, the high molecular weight organic materials and the pigments obtained according to the present invention, together with optional additives such as fillers, other pigments, siccatives or plasticizers, are finely dispersed or dissolved in a common organic solvent or mixture of solvents. The procedure may be such that the individual components or blends thereof are dispersed or dissolved in the solvent and subsequently all the components are mixed.

It is also to be noted that the instant oxidation process using molecular oxygen, for example air, as the oxidizing agent, only catalytic amounts of anthraquinone derivatives and easily recoverable organic solvents is both ecologically and economically attractive.

The new gamma form of quinacridone according to the invention manifests excellent pigmentary properties such as heat, weather, light, bleed and migration resistance and crystallographic stability in high dielectric constant solvents such as dimethylformamide. It shows an attractive yellow shade red color tone with high saturation and excellent outdoor durability, thus offering new styling opportunities.

The new gamma form is of particular importance at a relatively large particle size (0.2–0.8 $\mu$m), or low surface area ($<30$ m$^2$/g), and at a high degree of crystallinity. At the preferred particle size, the new form shows considerable light scattering and consequent opacity, which are of particular importance when the pigment is used in solid color automotive finishes.

Notwithstanding that the key aspect of the instant invention is the preparation of the new gamma quinacridone polytype, it is to be noted that the invention is deemed to include pigments which comprise blends of the new gamma quinacridone and minor amounts, i.e. less than about 50%, by weight, of conventional $\gamma$I and/or $\gamma$II quinacridone. The blends exhibit the distinguishing characteristics and the pigmentary properties of the new gamma quinacridone, although to a somewhat lesser degree.

The following examples further illustrate the preferred embodiments of this invention. In these examples, all ingredients are expressed in weight.

EXAMPLE 1

A 500 ml flask equipped with a thermometer, stirrer, condenser and gas inlet tube is charged with 10 grams 6,13-dihydroquinacridone and 120 ml dimethylsulfoxide and, thereafter, with 14 grams 50% aqueous sodium hydroxide, 10 ml water and 0.6 grams anthraquinone-2-sulfonic acid sodium salt monohydrate. Air is introduced slowly (90–96 ml/min.) over the surface of the stirred reaction mixture via the gas inlet tube, and the mixture is then heated to 82° C. and kept for 50 minutes at that temperature with stirring and air flow. The resulting hot deep blue solution of the pigment salt is drowned into 500 ml methanol having a temperature of 18°–20° C. whereby the red quinacridone pigment is precipitated and the temperature rises to 40° C. The pigment suspension is stirred at 40° C. for 6 hours. The pigment is isolated by filtration, and washed dimethylsulfoxide-free with methanol followed by water to a pH 7.5–8.0 and dried. The yield of the pigmentary quinacridone is 9.6 grams and contains less than 0.1% 6,13-dihydroquinacridone and less than 0.1% quinacridonequinone determined by spectrophotometric methods. Its powder X-ray diffraction pattern is as described in detail hereinabove and it exhibits a specific surface area of 23 m$^2$/g.

The pigmentary qualities are determined by rubout readings. Rubouts are prepared in lithographic varnish with a Hoover Muller. The apparatus is equipped with a ⅛ HP 110–220 V, 60 cycle motor and two glass plates. The muller can be adjusted to stop after 25, 50, 75, or 100 revolutions with 50 revolutions being considered normal. Three weights are used which apply 150 pounds pressure between the plates. In each case, 0.6 grams of dry pigment and 1.2 grams of a lithographic varnish drier are mixed with a spatula on the lower glass plate. The upper plate is locked to the lower plate, and the motor is set to stop after fifty revolutions. The plates are separated and the pigment in ink dispersion is picked up and spread out again on the lower plate and the operation repeated six more times. The resulting pigment as an ink dispersion, referred to as the masstone ink, is drawn down versus an appropriate control prepared in the identical manner. In order to assess color strengths of the samples, calculated amounts of the masstone ink (0.18 grams) and a zinc oxide past dispersion (10 grams) are weighed accurately and mixed with a spatula on a polished glass plate. Any controls are prepared in an identical manner.

By rubout in a lithographic varnish, the pigment shows an opaque very yellowish red masstone and an intense red color in TiO$_2$ extension. When incorporated into plastics or paints, the pigment imparts a very yellowish red color with excellent fastness properties.

EXAMPLE 2

The procedure of Example 1 is repeated using 0.6 grams of the anthraquinone-2,6-disulfonic acid disodium salt instead of anthraquinone 2-sulfonic acid sodium salt as the catalyst for the oxidation reaction to yield 9.65 grams of the new gamma quinacridone showing the distinctive X-ray diffraction pattern of the new gamma quinacridone and comparably good fastness properties.

EXAMPLE 3

A 2 liter flask equipped with a thermometer, stirrer, condenser and gas inlet tube is charged with 50 grams 6,13-dihydroquinacridone and 600 ml dimethylsulfoxide, followed by 70 grams 50% aqueous sodium hydroxide, 50 ml water and 3.0 g anthraquinone-2-sulfonic acid sodium salt monohydrate. Air is introduced via a gas inlet tube at a rate of 175–185 ml/min over the surface of the stirred reaction mixture, which is then heated to 82° C. and kept for 1½ hours at that temperature with stirring and air flow. The resulting hot deep blue solution of the pigment salt is drowned into 2.2 liters methanol having a temperature of 20° C. and the precipitated pigment suspension is heated to reflux (72° C.) and refluxed for 3 hours. The pigment is isolated by filtration and washed dimethylsulfoxide-free with methanol followed by water to pH 7.5–8.0 and dried. The yield of the pigmentary quinacridone is 48 grams.

The resulting product shows the X-ray diffraction pattern of the new gamma quinacridone and contains less than 0.1% 6,13-dichloroquinacridone and less than 0.1% quinacridonequinone as determined by spectrophotometric methods. When incorporated into plastics or paints, the pigment imparts an opaque very yellowish red color with excellent fastness properties.

EXAMPLE 4

The procedure of Example 1 is repeated using 8.3 grams 45% aqueous potassium hydroxide instead of 14 grams 50% aqueous sodium hydroxide, 8 ml water and 70–80 ml/min air introduction to yield 9.6 grams of the new gamma quinacridone showing the distinctive X-ray diffraction pattern of the new gamma quinacridone and comparably good fastness properties.

EXAMPLE 5

The procedure of Example 4 is repeated with the exception that 7.6 grams 50% aqueous sodium hydroxide is utilized to yield 9.5 grams of the new gamma quinacridone showing the distinctive X-ray diffraction pattern of the new gamma quinacridone and comparably good pigmentary properties.

EXAMPLE 6

A mixture of 63.0 grams of polyvinylchloride, 3.0 grams epoxidized soya bean oil, 2.0 grams of barium/-cadmium heat stabilizer, 32.0 grams dioctylphthalate and 1.0 gram of the new gamma quinacridone form prepared according to Example 1 is prepared in a glass beaker using a stirring rod. The mixture is formed into a soft PVC sheet with a thickness of 0.4 mm by rolling for 8 minutes on a two-roll laboratory mill at a temperature of 160° C., a roller speed of 25 rpm and friction of 1:1.2 by constant folding, removal and feeding. The resulting soft PVC sheet is colored in a tinctorially strong yellowish red shade with excellent fastness to heat, light and migration.

EXAMPLE 7

Five grams of the new gamma quinacridone prepared according to Example 1, 2.5 g CHIMASORB 944 LD (hindered amine light stabilizer), 1.0 g TINUVIN 328 (benzotriazole UV absorber), 1.0 g IRGAFOS 168 (phosphite process stabilizer) (all polymer additives from CIBA-GEIGY Corp.) are mixed in a BANBURY mixer together with 1000 g high density polyethylene (MA-778, Quantum Chemicals) at a speed of 175–200 rpm and a total residence time of approximately three minutes. The fluxed pigmented resin is chopped up while warm and maleable, and then fed through a granulator. The resulting granules are molded on a BATTENFELD 1000 injection molder with a 5 minute dwell time and a 30 second cycle time at temperatures of 205° C., 260° C. and 315° C., respectively.

For comparison purposes, commercial gamma quinacridones (MONASTRAL Red RT-759-D from CIBA-GEIGY Corp. and HOSTAPERM Red E3B from Hoechst) are incorporated in a similar manner as described above.

A color spectrophotometer with D-65 illuminant, C.I.E. lab scale and 10 degree observer with specular component included is used to measure the L,A,B color space values of the above prepared chips at 205° C. In addition, the total color difference values (ΔE) of chips molded at 260° C. and 315° C. are measured versus chips molded at 205° C. The values are noted in the following table.

| Pigment | Chips at 205° C. | | | ΔE vs. chips molded at 205° C. | |
| --- | --- | --- | --- | --- | --- |
| | L | A | B | 260° C. | 315° C. |
| New gamma quinacridone | 43.8 | 44.7 | 24.9 | 0.6 | 1.2 |
| MONASTRAL Red RT-759-D | 41.4 | 44.7 | 21.1 | 0.7 | 1.6 |
| HOSTAPERM Red E3B | 42.7 | 43.3 | 23.2 | 1.3 | 3.3 |

The high saturation as well as the lighter and yellower colortone of the new gamma quinacridone versus the commercial counterparts is demonstrated by the L,A,B color space values. Additionally, the lower ΔE values are indicative of reduced color change and manifest the higher heat stability of the new gamma quinacridone.

EXAMPLE 8

A mixture of 100 grams polyethylene terephthalate granules and 0.5 grams of pigment obtained according to any one of Examples 1 to 5 can be blended for 15 minutes in a glass bottle on a roller gear bed. Extrusion of the mixture into a ribbon in a laboratory extruder will produce a ribbon colored in a uniformly strong yellowish red color of excellent light and heat fastness.

EXAMPLE 9

The procedure described in Example 8 can be repeated using APILON 52-651 polyurethane (AP1 spc Mussolente, Italy) to yield a strongly red shade-colored polyurethane ribbon having excellent lightfastness.

EXAMPLE 10

The procedure of Example 8 can be repeated using MOPLEN 850G polypropylene granules (Montedison) as the substrate to yield red colored chips which show excellent heat and lightfastness properties.

EXAMPLE 11

Six grams of the new gamma quinacridone prepared according to Example 1 can be stirred into 20 grams of a mixture of the following composition: 50 grams of a mixture of aromatic hydrocarbons (SOLVESSO 150-ESSO), 15 grams of butylacetate, 5 grams of ketoxime-based leveling agent, 25 grams of methyl isobutyl ketone and 5 grams of silicone oil (1% in SOLVESSO 150). Upon complete dispersion, 48.3 grams of acrylic resin (51% in 3:1 xylene/butanol) (BAYCRYL L 530-BASF) and 23.7 grams of melamine resin (MAPRENAL TTX-HOECHST-55% in butanol) are to be added, the batch briefly homogenized in a horizontal bead mill under shear and the resultant coating composition sprayed onto a metal sheet and stoved for 30 minutes at 130° C. The finish so obtained will exhibit a red shade of excellent fastness properties, with the enamel being distinguished by good flow properties and excellent dispersion of the pigment.

EXAMPLE 12

The following ingredients can be thoroughly milled for 96 hours in a ball mill:

25.2 grams  Polyester resin, 60% in SOLVESSO 150,

-continued

| | |
|---|---|
| 2.7 grams | melamine resin, 55% in butanol, (MAPRENAL MF-650-HOECHST) |
| 15.5 grams | cellulose acetobutyrate (25% in xylene/butyl acetate 1:2) |
| 1.1 grams | catalyst based on mineral oil/carboxylate (IRGASOL TZ6-CIBA-GEIGY AG) |
| 23.3 grams | butyl acetate |
| 11.6 grams | xylene |
| 1.6 grams | SOLVESSO 150 (ESSO) |
| 9.6 grams | the large particle size yellow shade red quinacridone obtained according to Example 3 |

The coating resulting from diluting the pigment dispersion with a mixture of butyl acetate/xylene/SOLVESSO 150 (in the same proportions as shown above) to a viscosity of about 18 seconds (20° C.) according to DIN 4, subsequent spraying onto a metal sheet, and exposure to air for 2 minutes at about 40° C. can be further coated with a clear unpigmented top coat comprised of:

| | |
|---|---|
| 53.3 grams | acrylic resin, 60% in xylene (VIACRYL VC 373-VIANORA) |
| 27.3 grams | melamine resin, 55% in butanol, (MAPRENAL MF 590-HOECHST) |
| 1.0 grams | SILICONE OIL A - 1% in xylene (BAYER) |
| 1.0 grams | benzotriazole derivative (TINUVIN 900-CIBA-GEIGY AG) |
| 5.4 grams | xylene |
| 4.0 grams | SOLVESSO 150 (ESSO) |
| 3.0 grams | ethylene glycol acetate |

Exposure to air for 30 minutes at 40° C. and then stoving for 30 minutes at 135° C. will yield a red coating having excellent fastness properties.

EXAMPLE 13

This example illustrates the incorporation of the new gamma quinacridone form into a high solids enamel finish.

Pigment Dispersion Formulation

A 0.26 liter jar is charged with 42.2 grams of the pigment prepared according to Example 3, followed by 66.0 grams of acrylic resin, 57.5 grams of xylene and 980 grams of 4 mm diameter steel diagonal rods. The mixture is milled in the jar for 64 hours on a roller mill. The dispersion contains 28% pigment and 56% solids at a pigment to binder ratio of 1.0.

Catalyst and Stabilizer Solution Preparation

A 4.2 liter jar with an impeller stirrer is charged with 755 grams ethyl acetate, 1177 grams UV-screener solution (contains benzotriazole UV absorber-TINUVIN 1130 from CIBA-GEIGY Corp.) and 47.9 grams of an amine solution (N-propylamine in xylene, methanol, butanol). A mixture of 34.8 grams methanol and 113.8 grams dodecylbenzenesulfonic acid is added and the resulting solution is stirred for 20 minutes.

Paint Formulation 36.2 grams of above described pigment dispersion, 39.6 grams of acrylic resin, 28.4 grams of melamine resin and 20.8 grams of catalyst and stabilizer solution are mixed and diluted with xylene to spray viscosity of 13–17 seconds using No. 4 FORD cup. The paint (masstone) is sprayed onto a primed aluminum panel, exposed to ambient air for 10 minutes and stoved for 30 minutes at 130° C.

The yellow shade red colored coating so obtained has excellent weatherability. The table below compares the color coatings of the new gamma modification with coatings prepared by a similar manner using MONASTRAL Red RT-759-D (CIBA-GEIGY Corp.) which shows the X-ray diffraction pattern of a γ-II-quinacridone and CROMOFINE 6810 (DIANICHISEIKA) which shows the X-ray diffraction pattern of a γ-I-quinacridone.

The color is characterized by the following instrumental color readings obtained on a spectrophotometer using D65 illuminant, C.I.E. lab-scale and ten degree observer with specular component included, expressed in L,A,B color space values.

| Pigment in coating | L | A | B |
|---|---|---|---|
| New gamma form quinacridone | 39.9 | 42.2 | 20.4 |
| MONASTRAL Red RT-759-D | 38.2 | 39.4 | 16.6 |
| CROMOFINE 6810 | 40.0 | 44.5 | 19.9 |

The measured highest B-value of the new gamma quinacridone when compared to the B values of the commercial samples manifests the yellower red color tone of the new γ-III-form.

EXAMPLE 14

This Example further demonstrates the styling opportunities in the field of automotive finishes for the new gamma quinacridone obtained according to the present invention. Thus, the new form is compared to the known γ-II-form (MONASTRAL Red RT-759-D, from CIBA-GEIGY Corp.) and the known γ-I-form (CROMOFINE 6810, from DAINICHISEIKA) in a mixture with the diketopyrrolopyrrole pigment, C.I. Pigment Red 254.

Thus, blends are prepared consisting of 50% IRGAZIN DPP Red BO (C.I. Pigment Red 254 from CIBA-GEIGY Corp.) and 50% of the new gamma quinacridone prepared according to Example 1 (1), 50% of MONASTRAL RED RT-759-D (2) as well as 50% of CROMOFINE 6810 (3), respectively.

The blends (1), (2) and (3) are incorporated into a high solids enamel system as described in Example 11 and the color of the obtained coatings is again measured and expressed in L,A,B color space values:

| Coating | Color space values | | |
|---|---|---|---|
| | L | A | B |
| (1) | 41.4 | 47.4 | 26.0 |
| (2) | 39.9 | 45.0 | 23.4 |
| (3) | 40.9 | 47.5 | 25.3 |

The coating (1) containing the new gamma quinacridone according to the present invention is yellower (highest B-value) and lighter (highest L-value) than the commercial forms of gamma quinacridone.

Summarizing, it is seen that this invention provides a new gamma quinacridone polytype or pigment form with a broad range of new application opportunities. Variations may be made in proportions, procedures and materials without departing from the scope of the invention as defined by the following claims.

What is claimed is:

1. A yellowish-red quinacridone pigment in gamma crystal form characterized by an X-ray diffraction pattern exhibiting four strong lines corresponding to 2Θ double glancing angles of 6.7, 13.3, 14.0 and 26.6, one medium strength line corresponding to 13.6 and seven relatively weak lines corresponding to 17.2, 20.6, 21.9, 24.0, 25.3, 28.1 and 28.8.

2. The gamma quinacridone pigment of claim 1, the particles of which have an average particle size of about 0.2–0.8 μm.

3. The gamma quinacridone of claim 1 in combination with minor amounts of (a) gamma I form quinacridone pigment characterized by an X-ray diffraction pattern exhibiting three strong lines corresponding to 2Θ double glancing angles of 6.6, 13.9 and 26.5, three medium strength lines at 13.2, 13.5 and 23.8 and four weak lines 17.1, 20.5, 25.2 and 28.6; (b) gamma$_{II}$ form quinacridone pigment characterized by an X-ray diffraction pattern exhibiting three strong lines corresponding to 2Θ double glancing angles of 6.6, 13.9 and 26.3, five medium strength lines at 13.2, 13.4, 23.6, 25.2 and 28.3 and two weak lines at 17.1 and 20.4; and (c) a mixture of (a) and (b).

* * * * *